United States Patent
Augustin

(10) Patent No.: US 6,286,848 B1
(45) Date of Patent: Sep. 11, 2001

(54) TWO-WHEELED FOLDING BICYCLE

(75) Inventor: Stephan Augustin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/486,893

(22) PCT Filed: Jun. 18, 1998

(86) PCT No.: PCT/EP98/03717

§ 371 Date: Jun. 5, 2000

§ 102(e) Date: Jun. 5, 2000

(87) PCT Pub. No.: WO99/11513

PCT Pub. Date: Mar. 11, 1999

(30) Foreign Application Priority Data

Sep. 4, 1997 (DE) ............................................. 197 38 770

(51) Int. Cl.[7] ............................... B62K 3/00; B62K 15/00
(52) U.S. Cl. ............................................ 280/287; 280/288
(58) Field of Search ................................. 280/278, 287, 280/281.1, 279, 288, 283, 284

(56) References Cited

U.S. PATENT DOCUMENTS

| | | | |
|---|---|---|---|
| 1,428,496 | * 9/1922 | Roquefort-Villeneuve | 280/278 |
| 1,626,775 | * 5/1927 | Appelian et al. | 280/278 |
| 3,374,009 | * 3/1968 | Jeunet | 280/287 |
| 3,623,749 | * 11/1971 | Jensen | 280/278 |
| 4,111,447 | * 9/1978 | Ishida | 280/278 |
| 4,296,940 | * 10/1981 | Herbert | 280/278 |
| 4,460,191 | * 7/1984 | Ishibashi et al. | 280/287 |
| 4,460,192 | * 7/1984 | Takamiya et al. | 280/287 |
| 4,895,386 | * 1/1990 | Hellestam et al. | 280/287 |
| 5,069,468 | 12/1991 | Tsai et al. | |
| 5,125,678 | * 6/1992 | Bogen | 280/278 |
| 5,149,119 | * 9/1992 | Hwang | 280/275 |
| 5,186,482 | * 2/1993 | Sapper | 280/278 |
| 5,193,834 | * 3/1993 | Strozyk | 280/278 |
| 5,452,910 | 9/1995 | Harris . | |
| 5,772,227 | * 6/1998 | Michail | 280/275 |
| 6,032,971 | * 3/2000 | Herder | 280/278 |

FOREIGN PATENT DOCUMENTS

| | | |
|---|---|---|
| 2405964 C2 | 3/1985 | (DE) . |
| 4311998 A1 | 10/1994 | (DE) . |
| 4313832 A1 | 11/1994 | (DE) . |
| 94 16 803 | 1/1995 | (DE) . |
| 4400500 A1 | 7/1995 | (DE) . |
| 528992 | 11/1921 | (FR) . |
| WO95/33646 | 12/1995 | (WO) . |

OTHER PUBLICATIONS

Seit Juli Können sich, "Diese Federn kann nichts erschüttern", Infothek, Radmarkt, 8/96, p. 6.

"Messen" Radfahren 6/95, p. 24.

Abstract of JP 7–205,863 Patent Abstracts of Japan, Ueda Atsush, "Frame Body For Folding Bicycle", Aug.–1995.

* cited by examiner

Primary Examiner—Robert P. Olszewski
Assistant Examiner—Andrew J. Fischer
(74) Attorney, Agent, or Firm—Crowell & Moring LLP

(57) ABSTRACT

A two-wheel folding bicycle is described which can be folded together in the plane of the bicycle frame. For this purpose, the bicycle frame is designed of two rigid partial frames, specifically a main frame with a receiving device for the seat pillar and a front wheel fork and a partial frame for the rear wheel. The two frame parts are connected with one another by way of two hinged supporters and are fixed to one another in a ready-to-ride condition.

24 Claims, 2 Drawing Sheets

TWO-WHEELED FOLDING BICYCLE

BACKGROUND AND SUMMARY OF THE INVENTION

The invention relates to a two-wheel folding bicycle, which can be folded together in the plane of the bicycle frame, having a main frame, on whose rearward frame section a seat pillar can be fastened and on whose forward frame section a front wheel fork is rotatably disposed, and having a rearward rigid frame for receiving the rear wheel axle.

German Patent Document DE 43 11 998 A1 shows such a folding bicycle having a main frame which is-divided into several mutually hinged frame tubes. These frame tubes are adjoined toward the rear by a rigid partial frame for receiving the rear wheel axle. An upper tubing of the main frame is divided into two tube sections which are also hinged to one another and can be fixed by means of the hinge point on a lower tubing. If the connection is opened up at this point, the main frame can be pushed together like a shears-type frame with rigid and movable joints in the direction of the rearward partial frame.

A similar construction is illustrated in U.S. Pat. No. 5,069,468, with the difference that here a steadying strut connects the upper tubing with the lower tubing and is displaceably held on the lower tubing. In the ready-to-ride condition, however, the steadying strut is fixed on the lower tubing. In the case of this known embodiment, all frame components are always connected with one another during the folding.

It is an object of the invention to provide, in the case of the folding bicycle of the above-mentioned type, a main frame which is stable and resistant to deformations when the bicycle is used and which permits the folding-together of the bicycle by means of a few manipulations.

According to the invention, this object is achieved by providing a folding bicycle of the above-noted type wherein the main frame is also designed as a rigid frame, wherein the main frame and the partial frame can be folded together by way of at least two hinged supports in the frame plane, wherein each hinged support is hinged by means of its one end by way of a first hinge on the main frame and, by means of its other end, by way of another hinge on the partial frame, and the axes of rotation of all hinges extend in parallel to one another and perpendicularly to the frame plane, and wherein a re-leasable connection fixes the partial frame on the main frame of the characteristics of the main claim. Advantageous further developments of the invention are contained in the subclaims.

According to the invention, in addition to the partial frame, the main frame also has a rigid design and thus provides the bicycle frame as a whole with sufficient stiffness. Viewed in the direction of the plane of the bicycle frame, the two hinged supports form a four-point hinge chain by means of their hinge points. As the result of this hinging, the rearward partial frame, together with the rear wheel, after the release of the fixing, can be swivelled without effort toward the front in the direction of the main frame and can be placed tightly against the main frame, so that the folding bicycle as a whole can be folded together to a small size. However, it should be pointed out that the invention is not necessarily limited to two hinged supports. Thus, according to the requirements, each hinged support or only one hinged support may be designed as a double hinged support which is divided into one support respectively on both sides of the frame plane.

In the collapsed position, the main frame and the partial frame may optionally be fixed by a splint or similar device in order to be able to better handle the folding bicycle when storing it, for example, in a trunk of a motor vehicle.

In the simplest case, the rear partial frame is rigidly connected with the main frame. However, the construction of the folding bicycle according to the invention also permits the arranging of the rearward partial frame in a resilient manner with respect to the main frame. For this purpose, a damper-spring unit, which is known per se, is provided in the area of the fixing of the two frame parts. However, in certain riding situations, for example, when riding uphill, it may be desirable to stop the resilience, for example, by means of a simple splint between the partial frame and the main frame.

In order to eliminate propulsion influences, it is also advantageous to dispose the pedal crank for the chain drive of the rear wheel on the partial frame. Furthermore, it is advantageous for the stability of the bicycle during the ride for the instantaneous center of rotation resulting from the hinged supports, about which the rearward partial frame swings during compression movements, to be situated in the area of the axis of the bottom bracket ball bearing. In this case, the instantaneous center of rotation is defined by the intersection point of the lengthened connection lines between the axes of rotation of the two hinges of the respective hinged support. Its position moves corresponding to the compression movements of the rear wheel. Where it is precisely situated in the starting situation, thus, when the load is normal, depends on the respective wishes with respect to the riding characteristics and correspondingly on the set angles of the hinged supports.

For reasons of production and cost, it is also expedient to provide both hinged supports with an identical shaping.

If, in the case of the bicycle according to the invention, a longitudinal control bar rotationally disposed on the main frame guides the front-wheel fork, it may be advantageous—for reducing the constructional expenditures—, to combine the upper hinge of the forward hinged support with this hinge of the longitudinal control bar. In this case, the axes of rotation of both hinges will coincide.

Additional advantageous further developments of the invention are indicated in the following description of an embodiment by means of the pertaining drawing.

DETAILED DESCRIPTION OF THE DRAWINGS

Figure 1:
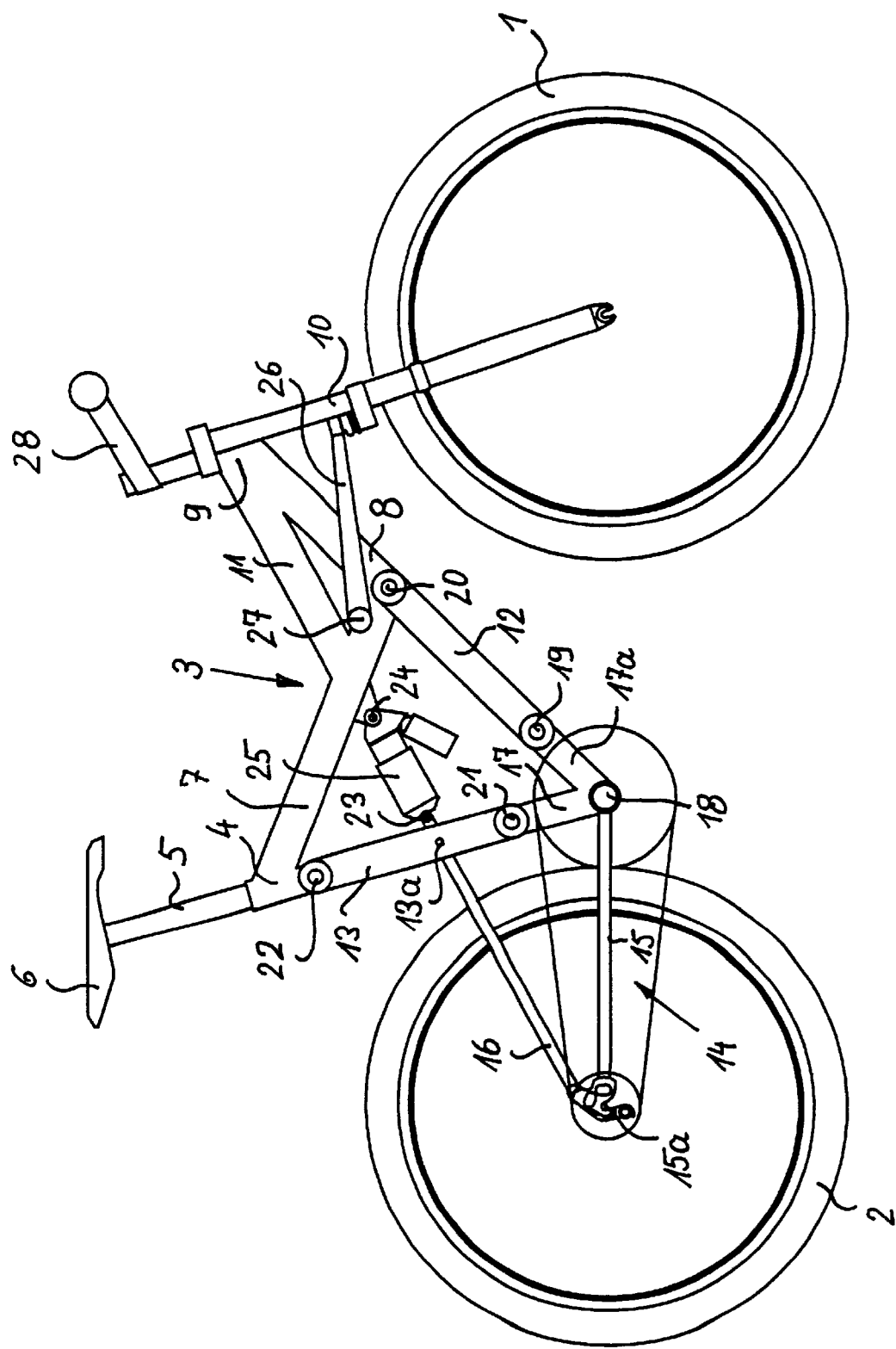
FIG. 1 is a view of a folding bicycle with a resilient rear wheel which is ready to be ridden.

The folding bicycle illustrated in FIG. 1 has a front wheel 1 and a rear wheel 2. The two wheels are connected with one another by way of a bicycle frame consisting of two parts. The first part is formed by a main frame 3 which, in itself, has a rigid design and, in a rear section, provides a receiving device 4 for a seat pillar 5. The seat pillar 5 carries a seat 6. From the receiving device 4, a frame strut 7 extends to the front in the direction of the front wheel 1. It is sloped slightly downward and verges at its forward end into a lower tubing 8 extending diagonally upward. At the free end of the lower tubing 8, a steering head 9 is provided in one piece, for the rotatable receiving of a front wheel fork 10 bearing the front wheel 1. A connection strut 11 extends in a downward sloped manner from the steering head 9 to a forward section of the frame strut 7 and completes the grid-type construction of the main frame 3. The individual frame parts are tube-type components with different cross-sectional shapes and dimensions. They are welded or hard-soldered to one another or are inseparably connected with one another in another fashion.

By way of two hinged supports 12 and 13, the second part of the bicycle frame, a rearward partial frame 14, is hinged to the main frame 3. The hinging will be described below. The partial frame 14 surrounds the rear wheel 2 in a fork-shaped manner and forms approximately a triangle on each side of the wheel. Because of the type of representation of FIG. 1, in which the plane of the sheet forms the plane of the bicycle frame set by the longitudinal axis of the folding bicycle, only one side of the fork-shaped partial frame 14 is visible. The following description will therefore refer only to that side, to the extent that the other side has a congruent construction.

Figure 2:
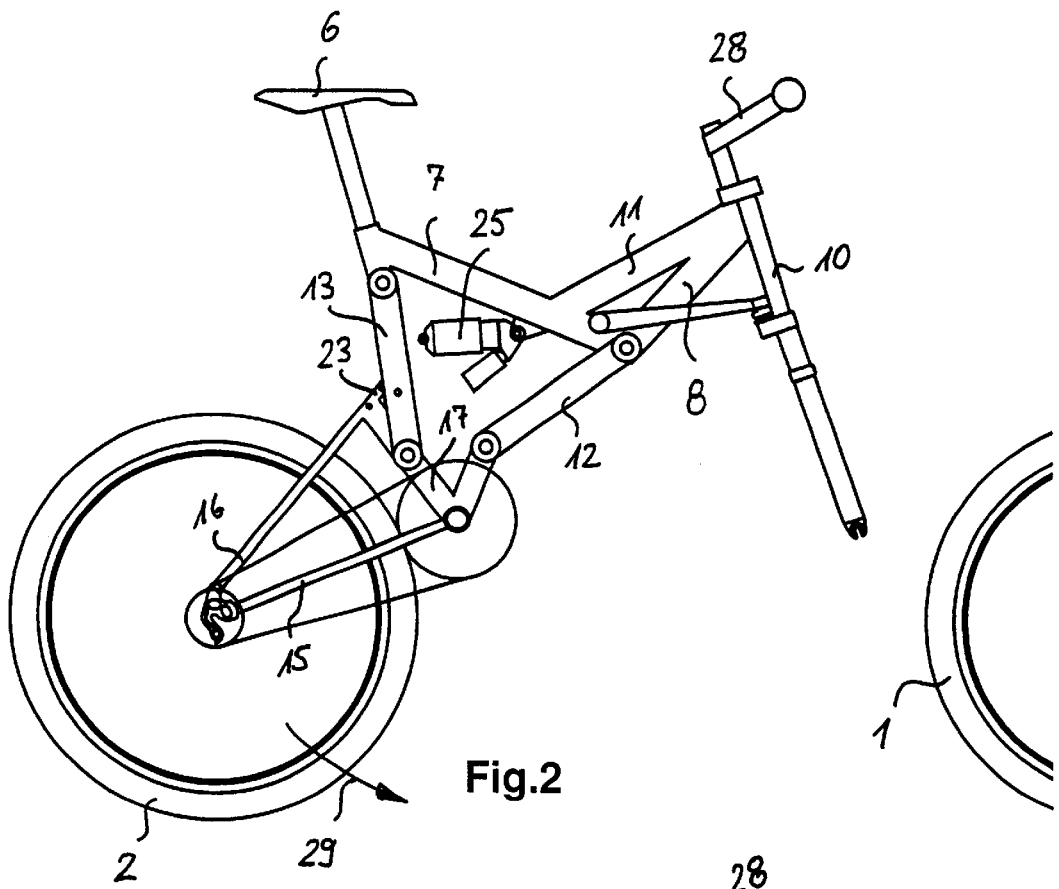
FIG. 2 is a view of the first steps for collapsing the folding bicycle according to FIG. 1.

The triangular shape of the partial frame 14 is formed by a first lower frame section 15 which, at its rearward end, provides a receiving slot 15a for the introduction of a wheel axle, which is not shown, of the rear wheel 2. This is adjoined by an upper frame section 16 which rises toward the front and diagonally in the upward direction. On the other side of the envelope curve of the rear wheel 2, the lower and upper frame sections of the two wheel sides converge and are connected with a forward frame section 17 which forms the third side of the triangle and is constructed as an individual tube 17. In FIG. 1, the connection point between the upper and forward frame section is covered by the hinged support 13, but is clearly visible in FIG. 2 and even better in FIG. 3. Concerning the further developments of the individual frame sections and their fastening with respect to one another, the statements concerning the main frame apply in a comparable manner.

In the connection point between the lower and forward frame section 15, 17, the bottom bracket ball bearing 18 is situated of a pedal crank which is indicated only by a circle and has a chain wheel. A drive chain leads form the chain wheel to the hub of the rear wheel 2.

In the area of the bottom bracket ball bearing 18, the forward frame section 17 forms a lengthening 17a which points to the front wheel 1 and has a bearing eye for the hinged connection of the lower end of the hinged support 12. The outlined hinge has the reference number 19. At its upper end, the hinged support 12 is disposed on the main frame 3 by means of another hinge 20 provided in the junction between the frame strut 7 and the lower tubing 8. Correspondingly, the rearward hinged support 13 connects by way of one hinge respectively 21, 22 the partial frame 17 with the main frame 3, that is, the forward frame section 17 with the receiving device 4 for the seat pillar 5.

Because of the type of representation, the figures only show one hinged support 12, 13. In reality, each hinged support 12, 13 is constructed as a double hinged support which is divided on both sides of the frame plane into one support respectively. However, it should be pointed out that, in the case of a corresponding constructive design, such double hinged supports can be eliminated in favor of single hinged supports.

The hinges of the hinged supports 12, 13 form a four-hinge chain and, as the result of the suitable arrangement of the hinges with respect to one another, as described above, the folding bicycle can be folded together to a small size. In the ready-to-ride condition, however, it is necessary to prevent the folding-together of the frame parts and, for this purpose, fix the partial frame on the main frame. The upper frame section 16 will then be extended beyond the forward frame section 17 in the direction of the main frame 3. The extension has the reference number 23. Correspondingly, an extension 23 is provided in the junction point between the frame strut 7 and the connection strut 11 which points in the direction of the rearward partial frame 14. Between this extension 23 and the extension 24, a damper unit 25 is linked in a hinged manner at both points and can be pushed together. In this case, the hinge on the extension 24 can easily be released manually (not shown in detail). By way of the damper unit 25, the partial frame 14 is, on the one hand, supported with respect to the main frame 7; on the other hand, as the result, the partial frame 14 acts as a resilient rear wheel rocker.

By way of a splint-type connection—instead, a plug-type bore 13a is illustrated in the hinged support in FIG. 1—, the partial frame can be fixed on the hinged support 13. In this manner, the damper unit is bridged and the bicycle frame as a whole exhibits the behavior of a rigid frame.

The longitudinal control bar 26 connects the front wheel fork 10 with the main frame 3. For this purpose, the rearward end of the longitudinal control bar 26 is disposed by way of a hinge 27 in the connection area between the frame strut 7 and the lower tubing 8 on the main frame 3. In this case, the axis of rotation of the hinge 27 extends transversely, that is, perpendicularly into the plane of the drawing and thus in parallel to the hinge axes of the hinged supports 12, 13. A ball joint, which is not shown in detail, disposes the forward end of the longitudinal control arm 26 on the front wheel fork 10. Finally, the front wheel fork 10 changes into a handle bar 28.

The longitudinal control bar 26 connects the front wheel fork 10 with the main frame 3. For this purpose, the rearward end of the longitudinal control bar 26 is disposed by way of a hinge 27 in the connection area between the frame strut 7 and the lower tubing 8 on the main frame 3. In this case, the axis of rotation of the hinge 27 extends transversely, that is, perpendicularly into the plane of the drawing and thus in parallel to the hinge axes of the hinged supports 12, 13. A ball joint, which is not shown in detail, disposes the forward end of the longitudinal control arm 26 on the front wheel fork 10. Finally, the front wheel fork 10 merges into a handle bar 28.

Figure 3:
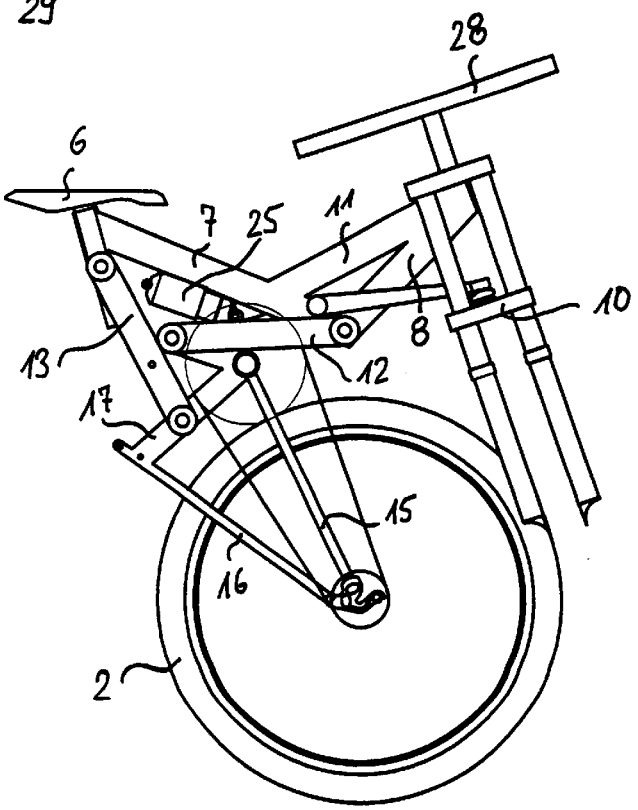
FIG. 3 is a view of the completely folded-together bicycle.

FIG. 3 shows the folded-together folding bicycle. In this case, the front wheel fork 10 was rotated by 90 degrees and the seat 6 was pushed to the rear. By removing the rear wheel 2, and removing the seat 6 and the handle bar 28, the bicycle can be folded together to an even smaller size. It can be stored, for example, in a trunk of a motor vehicle or can also be taken along in a backpack.

What is claimed is:

1. Two-wheel folding bicycle, which can be folded together in a plane of the bicycle frame, having a main frame, which on a rearward frame section a seat pillar can be fastened and on a forward frame section a front wheel fork is rotatably disposed, and having a rigid non-collapsing rearward partial frame receiving the rear wheel axle, wherein the main frame is designed as a rigid non-collapsing frame, wherein the main frame and the partial frame can be folded together by way of at least two hinged supports in the frame plane, wherein each of the hinged supports is hinged at one end by a first hinge on the main frame and, at an other end, by another hinge on the partial frame, and the axes of rotation of the hinges extend in parallel to one another and perpendicular to the frame plane, and wherein a releasable connection fixes the partial frame on the main frame.

2. Folding bicycle according to claim 1, wherein the partial frame is constructed as a rear wheel rocker, and a shock absorber is arranged between the partial frame and a fastening point on the main frame, thereby damping the compression movements of the rear wheel.

3. Folding bicycle according to claim 1, wherein the main frame consists of a frame strut which extends from a receiving device for the seat pillar to the front, of an adjoining lower tubing which, at a forward end, forms a steering head for the front wheel fork, and of an upper connection strut between the steering head and the frame strut, wherein the partial frame is designed in a triangular shape having a first lower frame section which, on a rearward end, receives the wheel axle of the rear wheel, having a upper frame section which adjoins the rearward end and extends diagonally upward and forward, and having a forward frame section which connects the forward end areas of the lower and upper frame section with one another, wherein a forward hinged support is hinged, on the one hand, to the side of the lower tubing of the main frame facing away from the steering head and is hinged, on the other hand, to the forward end of the lower frame section of the partial frame, wherein a rearward hinged support is disposed, by an upper hinge with the end of the frame strut of the main frame receiving the seat pillar and, by a lower hinge, on the forward frame section of the partial frame, and wherein the end of the upper frame section facing away from the wheel axle is fixed in the junction point between the frame strut and the connection strut on the main frame.

4. Folding bicycle according to claim 3, wherein the partial frame surrounds the rear wheel in a fork-shaped manner and has, on each wheel side, a lower and upper frame section which converge in the area of the forward frame section of the partial frame to form a single upper and a single lower frame section.

5. Folding bicycle according to claim 3, wherein the junction point between the lower and the forward frame section of the partial frame receives a bottom bracket ball bearing.

6. Folding bicycle according to claim 3, wherein the instantaneous center of rotation resulting from the hinges of the hinged supports is situated in the area of the axis of the bottom bracket ball bearing.

7. Folding bicycle according to claim 3, wherein the upper frame section of the partial frame can be fixed on the rearward hinged support.

8. Folding bicycle according to claim 3, wherein a longitudinal control bar supports the front wheel fork in such a manner that the longitudinal control bar, at one end, by way of a hinge with a transversely extending swivelling axis is disposed in the area of the junction point between the frame strut and the lower tubing of the main frame, and another end is connected by way of a ball joint with the front wheel fork.

9. Folding bicycle according to claim 8, wherein the axis of the control bar hinge coincides with the axis of the upper hinge of the forward hinged support.

10. Folding bicycle according to claim 2, further comprising a seat pillar which can be displaced in the receiving device of the frame strut and can be fixed in a selected position.

11. Folding bicycle according to claim 2, wherein the main frame consists of a frame strut which extends from a receiving device for the seat pillar to the front, of an adjoining lower tubing which, at a forward end, forms a steering head for the front wheel fork, and of an upper connection strut between the steering head and the frame strut, wherein the partial frame is designed in a triangular shape having a first lower frame section which, on a rearward end, receives the wheel axle of the rear wheel, having a upper frame section which adjoins the rearward end and extends diagonally upward and forward, and having a forward frame section which connects the forward end areas of the lower and upper frame section with one another, wherein a forward hinged support is hinged, on the one hand, to the side of the lower tubing of the main frame facing away from the steering head and is hinged, on the other hand, to the forward end of the lower frame section of the partial frame, wherein a rearward hinged support is disposed, by an upper hinge with the end of the frame strut of the main frame receiving the seat pillar and, by a lower hinge, on the forward frame section of the partial frame, and wherein the end of the upper frame section facing away from the wheel axle is fixed in the junction point between the frame strut and the connection strut on the main frame.

12. Folding bicycle according to claim 11, wherein the partial frame surrounds the rear wheel in a fork-shaped manner and has, on each wheel side, a lower and upper frame section which converge in the area of the forward frame section of the partial frame to form a single upper and a single lower frame section.

13. Folding bicycle according to claim 4, wherein the junction point between the lower and the forward frame section of the partial frame receives a bottom bracket ball bearing.

14. Folding bicycle according to claim 4, wherein the instantaneous center of rotation resulting from the hinges of the hinged supports is situated in the area of the axis of the bottom bracket ball bearing.

15. Folding bicycle according to claim 5, wherein the instantaneous center of rotation resulting from the hinges of the hinged supports is situated in the area of the axis of the bottom bracket ball bearing.

16. Folding bicycle according to claim 4, wherein the upper frame section of the partial frame can be fixed on the rearward hinged support.

17. Folding bicycle according to claim 5, wherein the upper frame section of the partial frame can be fixed on the rearward hinged support.

18. Folding bicycle according to claim 6, wherein the upper frame section of the partial frame can be fixed on the rearward hinged support.

19. Folding bicycle according to claim 4, wherein a longitudinal control bar supports the front wheel fork in such a manner that the longitudinal control bar, at one end, by way of a hinge with a transversely extending swivelling axis is disposed in the area of the junction point between the frame strut and the lower tubing of the main frame, and another end is connected by way of a ball joint with the front wheel fork.

20. Folding bicycle according to claim 5, wherein a longitudinal control bar supports the front wheel fork in such a manner that the longitudinal control bar, at one end, by way of a hinge with a transversely extending swivelling axis is disposed in the area of the junction point between the frame strut and the lower tubing of the main frame, and another end is connected by way of a ball joint with the front wheel fork.

21. Folding bicycle according to claim 6, wherein a longitudinal control bar supports the front wheel fork in such a manner that the longitudinal control bar, at one end, by way of a hinge with a transversely extending swivelling axis is disposed in the area of the junction point between the frame strut and the lower tubing of the main frame, and another end is connected by way of a ball joint with the front wheel fork.

22. Folding bicycle according to claim 7, wherein a longitudinal control bar supports the front wheel fork in such a manner that the longitudinal control bar, at one end, by way of a hinge with a transversely extending swivelling axis is disposed in the area of the junction point between the frame strut and the lower tubing of the main frame, and another end is connected by way of a ball joint with the front wheel fork.

23. Folding bicycle according to claim 19, wherein the axis of the control bar hinge coincides with the axis of the upper hinge of the forward hinged support.

24. Folding bicycle according to claim 9, further comprising a seat pillar which can be displaced in the receiving device of the frame strut and can be fixed in a selected position.

* * * * *